United States Patent [19]

Smith

[11] Patent Number: 5,454,273
[45] Date of Patent: Oct. 3, 1995

[54] MOTOR OPERATED VALVE ACTUATOR DIAGNOSTIC SYSTEM AND TEST STAND

[75] Inventor: Christopher P. Smith, Acworth, Ga.

[73] Assignee: Westinghouse Electric Corporation, Pittsburgh, Pa.

[21] Appl. No.: 375,079

[22] Filed: Jan. 17, 1995

Related U.S. Application Data

[63] Continuation of Ser. No. 194,197, Feb. 9, 1994, abandoned.

[51] Int. Cl.⁶ ........................................................ G01L 1/00
[52] U.S. Cl. ........................................ 73/862.191; 73/168
[58] Field of Search ............................ 73/168, 862.321,
73/862.27, 862.09, 862.14, 862.15, 862.17,
862.29, 862.31, 862.621, 862.191

[56] References Cited

U.S. PATENT DOCUMENTS

| | | | |
|---|---|---|---|
| 4,498,336 | 12/1985 | Dalton | 73/168 |
| 4,542,649 | 9/1985 | Charbonneau et al. | 73/168 |
| 4,570,903 | 2/1986 | Crass | 73/168 |
| 4,759,224 | 7/1988 | Charbonneau et al. | 1.73/862.29 |
| 4,787,245 | 11/1988 | Anderson et al. | 73/862.23 |
| 4,856,327 | 8/1989 | Branam et al. | 73/168 |
| 4,860,596 | 8/1989 | Charbonneau et al. | 73/862.32 |
| 4,879,901 | 11/1989 | Leon | 73/168 |
| 4,977,782 | 12/1990 | Stohr | 73/862.29 |
| 5,109,692 | 5/1992 | Fitzgerald | 73/862.321 |
| 5,111,690 | 5/1992 | Duff | 73/862.621 |
| 5,140,853 | 8/1992 | Branam et al. | 73/168 |
| 5,142,906 | 9/1992 | Smith | 73/862.627 |
| 5,174,152 | 12/1992 | Wohld | 73/168 |
| 5,197,338 | 3/1993 | Heiman et al. | 73/168 |
| 5,199,301 | 4/1993 | Bauer | 73/168 |
| 5,257,535 | 11/1993 | Evans | 73/862.29 |
| 5,305,637 | 4/1994 | Bauer | 73/862.31 |

*Primary Examiner*—Richard Chilcot
*Assistant Examiner*—Ronald L. Biegel
*Attorney, Agent, or Firm*—David G. Maire

[57] ABSTRACT

Disclosed is apparatus and a system for the diagnostic testing of a valve actuator used in an electric motor operated valve that is able to induce a variety of actively controllable and adjustable torsional and axial loads on the valve actuator and while providing measurement of both the torsional and axial forces being produced by the actuator while subject to the induced loads.

15 Claims, 3 Drawing Sheets

5,454,273

MOTOR OPERATED VALVE ACTUATOR DIAGNOSTIC SYSTEM AND TEST STAND

This application is a continuation of application Ser. No. 08/194,197 filed Feb. 9, 1994, now abandoned.

BACKGROUND OF THE INVENTION

This invention relates to a diagnostic system and a test stand apparatus to test, calibrate and troubleshoot motor operated valve actuators. It relates particularly to a diagnostic system and test stand apparatus that is able to measure, test, calibrate and analyze several important operating parameters associated with motor operated valve actuators. The invention is especially useful in the field of valve diagnostics.

In the nuclear power industry, valves are often actuated remotely by electric motors to open, closed and intermediate positions to improve or maintain power plant output and to maintain proper cooling of the nuclear reactor. Continuous and proper operation of the valves is essential for reliable operation of the power plant and safety of the general public. Motor operated valves are also used extensively in industries other than the nuclear power industry that also require continuous and reliable operation of the valve at all times.

The valve user industries and the valve manufacturing industry have had a need to develop apparatus, methods and systems to measure, test, and calibrate various operating parameters associated with the valves and to detect any significant changes or problems in any of the operating parameters being measured that could affect the continuous and reliable operation of the valve while it is in service.

U.S. Pat. No. 4,542,649 to Charbonneau et al. discloses a recently developed valve testing system for an electric motor operated valve that measures, records and correlates a number of valve operating parameters, such as valve stem load, valve stem movements, valve stem torque, spring pack movement and motor current. The information provided by the system described in the Charbonneau et al. patent provides a direct indication to the operator or test engineer of any valve problems, such as excessive or inadequate packing loads, excessive inertia, incorrectly set limit and torque switches, malfunctioning thermal overload devices, excessive stem thrust loads, gear train wear and damage to the valve stem.

As a result of the teachings of the Charbonneau et al. patent, efforts have been made by Movats, Inc., the assignee of the Charbonneau et al. patent, as well as the assignee of the present patent application, to develop additional apparatus, testing methods and systems by which the operation and performance of different types of valves and valve components could be easily measured, tested and evaluated. U.S. Pat. Nos. 4,759,224; 4,860,596; 5,140,853 and 5,142,906 describe several of the valve diagnostic systems developed by Movats, Inc. U.S. Pat. Nos. 4,498,336; 4,570,903; 4,856,327; 4,879,901; 4,977,782 and 5,174,152 describe several of the valve diagnostic systems developed by others working in this field.

In the past, valves and especially those operated by an electric motor, called an "MOV", were usually tested while in service in the field by one or more of the valve testing and diagnostic systems described in the above-noted prior patents. Two very important operating parameters of a MOV that need to be regularly tested, measured and calibrated are the torque and axial thrust produced by the electric motor driven valve actuator that is attached to the valve stem used to operate the valve to an open, closed or intermediate position. While several of the valve testing systems described in the above-noted prior patents are able to measure the torque and axial thrust acting on the valve stem while the valve is in actual service in the field, none of the prior art valve testing systems are capable of measuring the torque and and axial thrust produced by the valve actuator and acting on the valve stem while the valve stem, or its substitute equivalent drive shaft, is under actively adjustable, controllable and measurable axial and torsional loads.

SUMMARY OF THE INVENTION

It is therefore an object of this invention to provide a system and apparatus for the diagnostic testing of electric motor operated valves and valve actuators.

It is a further object of this invention to provide a system and apparatus for the diagnostic testing of the valve actuator of an electric motor operated valve that is able to provide both an actively controllable and adjustable torsional load and an actively controllable and adjustable axial load on the valve actuator during the diagnostic testing thereof.

It is a still further object of this invention to provide a system and apparatus for measuring the axial thrust and the torque produced by a valve actuator under a variety of simulated operating conditions.

It is another object of this invention to provide a system and apparatus for testing motor operated valve actuators prior to their being attached to valve assemblies and placed in service in the field.

These and other objects of this invention can be attained by apparatus for testing a motor operated valve actuator comprising a test stand or housing adapted to support an electric motor operated valve actuator in an operating position, a motively rotatable drive shaft member having one end secured to the actuator and the other end supported within the test stand or housing. The test stand or housing contains means adapted to apply an actively adjustable and controllable amount of torsional braking force on the drive shaft member during the rotation thereof and also means to apply an actively adjustable and controllable amount of axial force on the drive shaft member during the rotation thereof. The apparatus of this invention also includes a load bearing sensor mounted between the actuator and the test stand or housing and surrounding the drive shaft for measuring the both the axial and torsional forces being produced by the valve actuator being tested.

DESCRIPTION OF THE PREFERRED EMBODIMENTS

Figure 1:
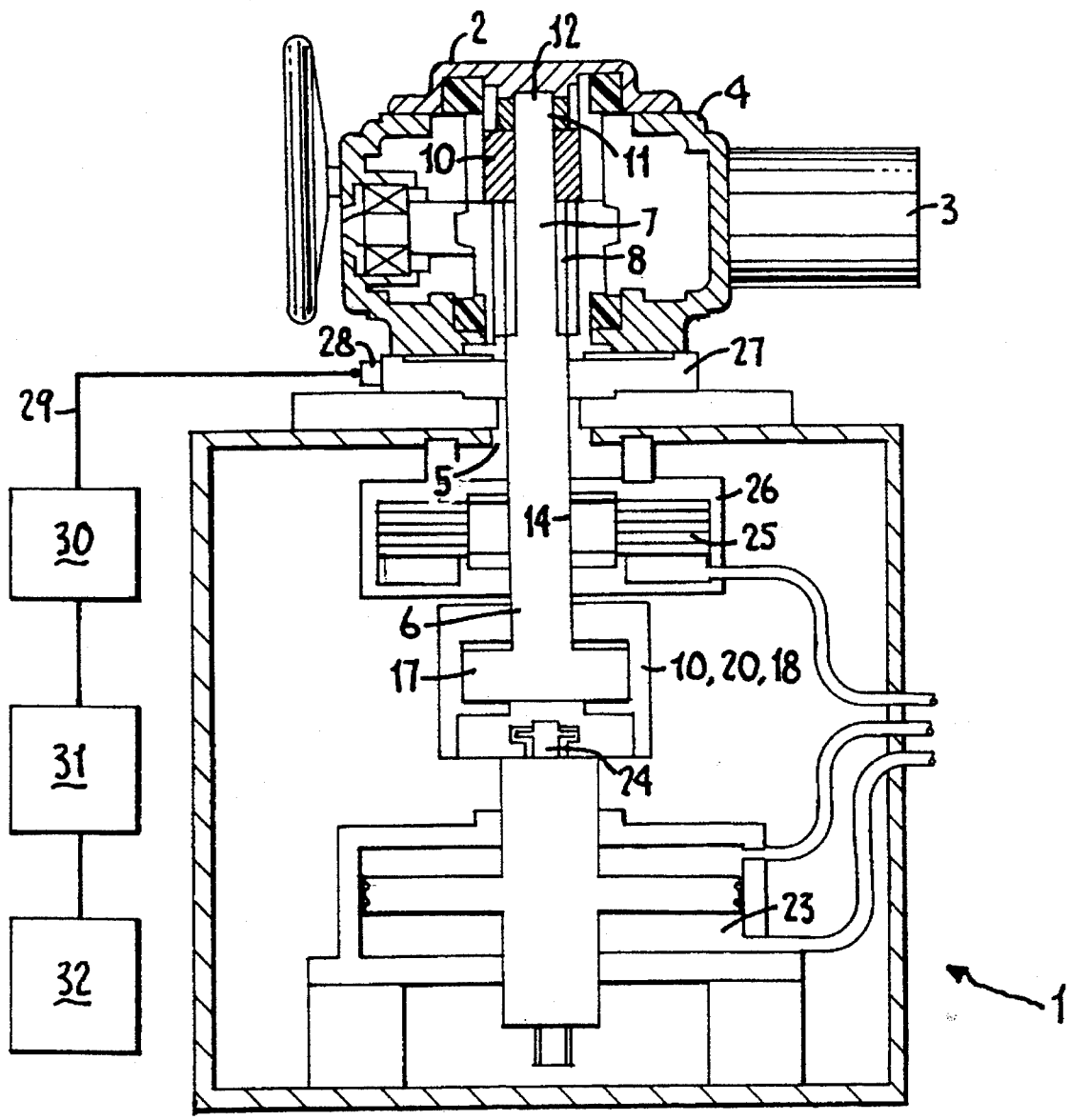
FIG. 1 is a an elevational view, partly in section, illustrating a preferred embodiment of the motor operated valve diagnostic system and test stand apparatus of this invention.

FIG. 1 illustrates an elevational view, partly in section, showing a preferred embodiment of the diagnostic system and test stand apparatus for a motor operated valve (MOV) actuator 2, according to this invention. The test stand apparatus shown in FIG. 1, uses a rigid box-like stand or housing 1 designed to support an electric motor driven valve actuator 2 in a position in which the actuator 2 may be operated and tested, but not connected to an actual valve or valve assembly.

There are many designs of motor driven valve actuators 2 but most use an electric motor 3 to drive a series of interconnected gears and shafts contained within a metal actuator housing 4, that when attached to a valve assembly will axially move a valve stem in the valve assembly that will move a valve plug between an open, closed or intermediate position relative to a valve seat in the valve assembly.

Figure 2:
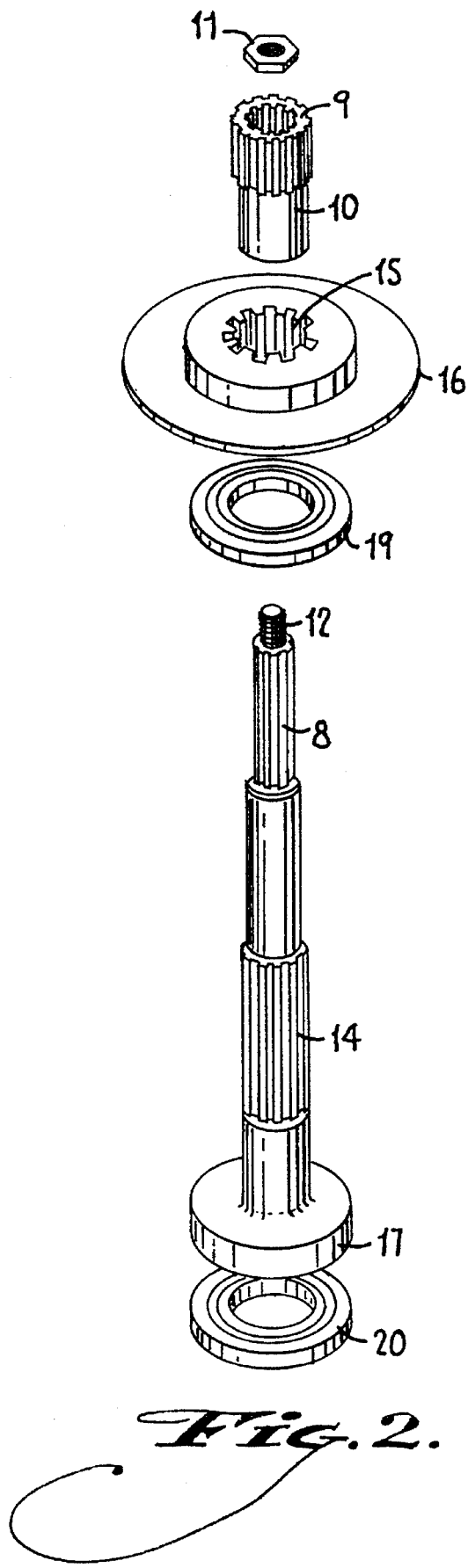
FIG. 2 is an exploded view of the main drive shaft and related components used in the preferred embodiment of the motor operated valve diagnostic system and test stand apparatus of this invention.

As shown in FIG. 1, the valve actuator 2 to be tested is placed on the stand or housing 1 over an opening 5 in the top of the stand or housing 1. For testing purposes, instead of being connected to the valve stem of an actual valve assembly, the valve actuator 2 is connected to a test drive shaft 6 which extends through the opening 5 in the top of the stand or housing 1 and into the interior of the stand or housing 1. As best illustrated in FIG. 2, the upper portion 7 of the test drive shaft 6 is provided with a plurality of involute splines 8 designed to engage mating involute splines 9 machined on the interior surface of an actuator drive gear 10. The actuator drive nut 10 is designed to replace, for testing purposes only, the valve stem drive gear or nut normally used in the valve actuator 2, when the valve actuator 2 is actually attached to a valve or a valve assembly. The actuator drive nut 10 is rigidly secured to the test drive shaft 6 with a lock nut 11 screwed onto threads 12 machined on the upper end of the test drive shaft 6.

As best illustrated in FIG. 2, a portion of the exterior of the actuator drive nut 10 is provided with a plurality of external peripheral splines 13 designed to engage the worm shaft or gear in the actuator 2 and allow it to be motively rotated during the testing of the valve actuator 2 by the electric motor 3 and the interconnected gears and shafts contained within the actuator housing 4 of the actuator 2 being tested. Thus, the actual design, shape and size of the splines 13 on this special drive nut 10 will vary according to the design and model of the valve actuator under test.

As shown in FIG. 2, a lower portion of the test drive shaft 6 is provided with a plurality of axial ball splines 14 designed to engage mating axial splines 15 machined on the interior of a disc brake rotor hub 16. The bottom of the test drive shaft 6 is provided with an enlarged circular flange 17. As shown in FIG. 1, a cylindrical thrust bearing housing 18, having an upper thrust bearing 19 and a lower thrust bearing 20 is fitted around the lower end of the test drive shaft 6 and around the circular flange 17 so that the circular flange 17 is positioned between the upper thrust bearing 19 and the lower thrust bearing 20 within the cylindrical thrust bearing housing 18, as shown in FIG. 1.

The bottom of the test stand or housing 1 contains a hydraulic or pneumatic ram assembly 23, preferably as illustrated in this embodiment, a push-pull, double acting hydraulic type that enables a movable ram 24 of the hydraulic ram assembly 23 to apply force upwardly or downwardly against the bottom face of the circular flange 17 of the test drive shaft 6. By controlling the force of the movable ram 24, the test engineer can actively apply a variety of adjustable and controllable amounts of axial force against the bottom of the test drive shaft 6 which axial force is then conveyed through the test drive shaft 6 into the valve actuator 2 being tested. This arrangement allows the transmission of adjustable but controllable axial force to the test drive shaft 6 and actuator 2 without restricting the ability of the drive shaft 6 to rotate. Axial force provided by the hydraulic ram 24 is directly proportional to the pressure within the controlling hydraulic system.

As shown in FIG. 1, the test stand or housing 1 also is provided with a hydraulic, electric or pneumatic disc brake assembly 25 contained within a housing 26 which surrounds the disc brake rotor hub 16 that is attached to the test drive shaft 6 by the involute splines 8, described above. The disc brake assembly 25 illustrated in this embodiment is preferably a conventional hydraulic disc torque brake assembly of suitable dimensions, preferably of the clutch plate type. With this brake assembly 25, the test engineer is able to actively apply adjustable and controllable amounts of torsional braking force to the test drive shaft 6 which torsional braking force is then conveyed through the test drive shaft 6 into the valve actuator 2 being tested.

Accurate control of the induced axial and torsional forces on the test drive shaft 6 can be done with any of the commonly available hydraulic, electrical or pneumatic control systems, many of which can be controlled by the test engineer using a PC computer. The hydraulic systems used in the illustrated embodiment can be operated as an open loop control or by adding sensors to the pressure systems, or using data from the load bearing sensor 27, described below, can be a feedback control system. If desired, additional test data could be obtained by adding a shaft speed sensor to the test drive shaft 6. Also, if desired, a motor power measuring cell, such as described in my co-pending U.S. patent application Ser. No. 08/161,036, filed Dec. 3, 1993 which measures actuator motor torque and electric motor shaft speed could be installed on the actuator 2 during the testing. Such an arrangement provides measurement of the throughput efficiency of the actuator 2 being tested under a variety of loading conditions, including quantification of the effect of drive sleeve axial load on the ratio of input torque to output torque and the ratio of input torque to control springpack displacement under various loading rates and patterns that may be produced using the system and apparatus of this invention.

This invention uses a load bearing sensor 27 positioned around the test drive shaft 6 and secured between the top of the test stand or housing 1 and the bottom of the actuator 2 being tested. The load bearing sensor 27 has a wiring connector 28 to connect it to an electrical cable 29 that leads to a signal conditioning module 30, a load bearing sensor output display 31 and a data recording device 32, as illustrated in FIG. 1.

The load bearing sensor 27 used in the preferred embodiment of this invention is described in U.S. Pat. No. 5,142,906 to Smith (Assigned to Westinghouse Electric Corporation) incorporated herein, in its entirety, by reference.

Figure 3:
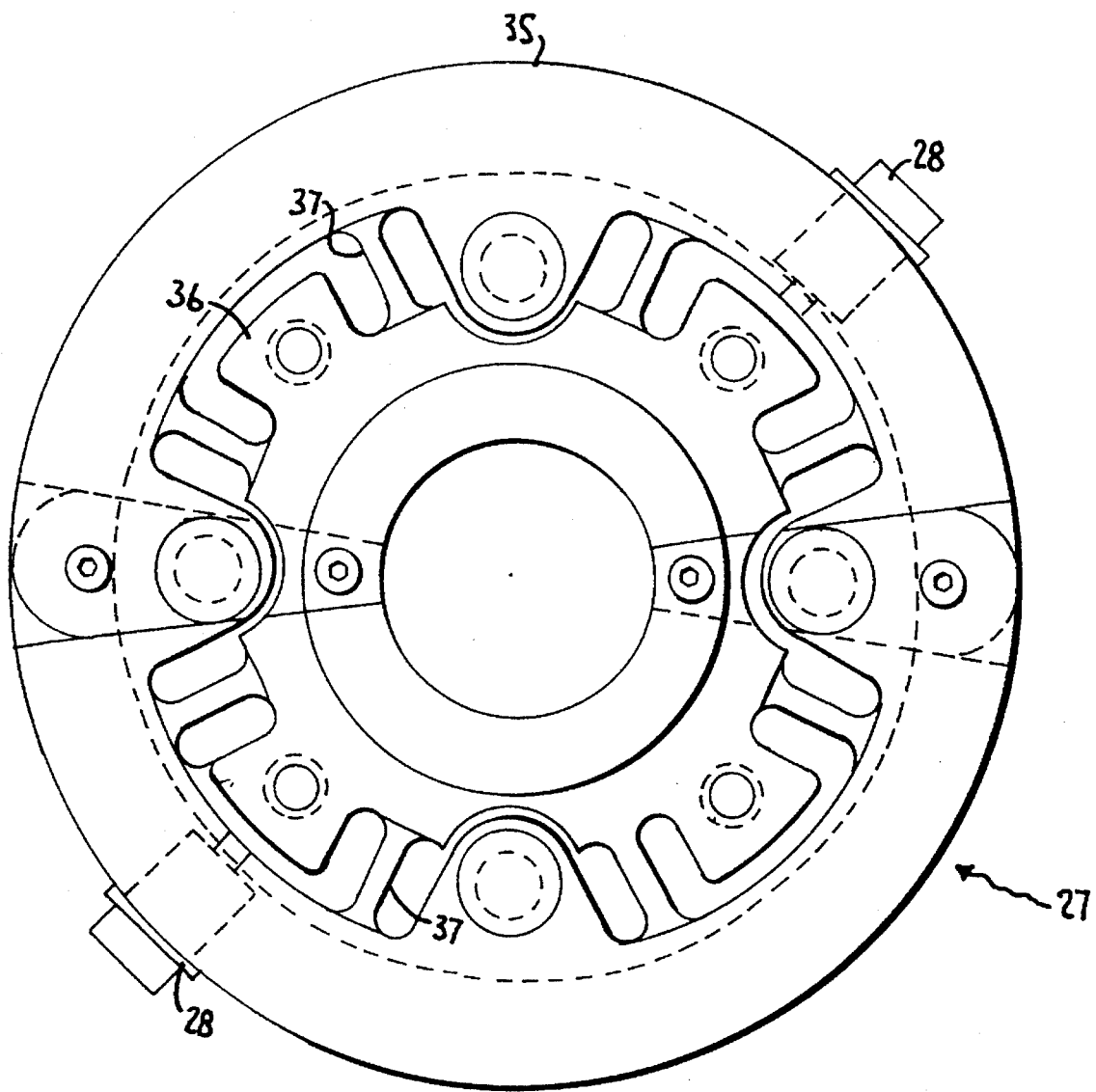
FIG. 3 is a bottom view of the load bearing sensor used for measuring both the axial and torsional forces being produced by the valve actuator being tested using the diagnostic system and apparatus of this invention.

FIG. 3 illustrates a bottom view of this type of load bearing sensor 27. The load bearing sensor 27 is comprised of an outer load ring 35, an inner load ring 36 connected together by eight shear webs 37. The inner load ring 36 is attached to the bottom the actuator housing 4 with bolts. The outer load ring is attached to the top of the test stand or housing 1 with bolts. It is also acceptable to reverse this arrangement, with the inner load ring 36 being attached to the top of the test stand or housing with bolts and the outer load ring 35 attached to the bottom of the actuator housing 4 with bolts, whichever is most convenient.

As shown in FIG. 3 and described in the above-mentioned U.S. Pat. No. 5,142,901, the shear webs 37 are used as the sole load bearing members between the outer load ring 35 and the inner load ring 36 and thus carry all the reaction forces resulting from the movement of the test drive shaft 6 and the actuator 2.

As described in the above-mentioned U.S. Pat. No. 5,142,906, electrical resistance strain gages (not shown) are placed on one or more of the shear webs 37 to measure these reaction forces. The strain gages placed on the neutral axes of the shear webs 37 will measure torque and the strain gages placed at an angle of forty-five degrees to the neutral axes of the shear webs 37 will measure axial thrust. All of the torque measuring strain gages on the shear webs 37 are wired together to form a wheatstone bridge circuit connected to the wiring connector 28 and all of the axial thrust measuring strain gages are wired together to form another wheatstone bridge circuit also connected to the wiring connector 28. Changes in voltage of the axial thrust measuring circuit and changes in voltage of the torque measuring circuit produced by forces acting on the strain gages are converted at the signal conditioning module 30 to a digital form for output at the sensor output display device 31 where it can display the actual torque and axial thrust produced by the actuator 2 under a variety of controlled operating conditions. The digital signals also go to a recording device 32, such as a computer disk, which will provide a record of the torque and axial thrust under a variety of test conditions induced by the test stand apparatus of this invention.

The apparatus and system of this invention can be used for research work on prototype or typical commercial actuators. It can be used especially to quantify the actual characteristics and capabilities of specific actuators during the manufacture and testing thereof, thereby producing an actuator that should prove more reliable in service.

It is believed the present invention and its advantages will be understood from the above description and the accompanying drawings and it will be apparent that changes may be made in the form, construction and arrangement as described without departing from the scope of this invention.

I claim:

1. Apparatus for testing a motor operated valve actuator comprising a test stand adapted to support an electric motor operated valve actuator in an operating position, a rotatable drive shaft member having one end thereof secured to said actuator and the other end extended within the test stand, means mounted between the actuator and the test stand for measuring both axial and torsional forces produced by the actuator, means connected to the test stand adapted to apply an adjustable and controllable amount of torsional braking force to the drive shaft member during the rotation thereof and means connected to the test stand adapted to apply an adjustable and controllable amount of axial force to the drive shaft member during the rotation thereof.

2. The apparatus of claim 1 in which the means to apply an adjustable and controllable amount of torsional braking force to the drive shaft member during the rotation thereof is a hydraulic, electrical or pneumatic brake.

3. The apparatus of claim 2 in which the brake is able to apply a torsional braking force to the drive shaft member without restricting axial movement of the drive shaft member.

4. The apparatus of claim 1 in which the means to apply the adjustable and controllable amount of axial force to the drive shaft member during the rotation thereof is a hydraulic, or pneumatic ram.

5. The apparatus of claim 4 in which the ram is a push-pull, double acting hydraulic or pneumatic ram.

6. The apparatus of claim 1 in which the means for measuring the both axial and torsional forces produced by the actuator is comprised of a pair of concentric load rings connected to each other by a plurality of web members, at least one of the web members provided with means to measure strains within the web member.

7. The apparatus of claim 1, having additional sensor means for measuring the torque and the rotational speed of the electric motor drive shaft used to motively operate the valve actuator.

8. The apparatus of claim 1 in which a shaft speed sensor is mounted on the drive shaft member.

9. Apparatus for testing a motor operated valve actuator comprising a test stand adapted to support said actuator, a rotatable drive shaft member connected to said actuator, means connected to said test stand for applying an adjustable and controllable amount of torsional braking force to said drive shaft member during the rotation thereof by said actuator, and means connected to said test stand for applying an adjustable and controllable amount of axial force to the drive shaft member during the rotation thereof by said actuator.

10. The apparatus of claim 9, further comprising means associated with said test stand for measuring both axial and torsional forces produced by said actuator.

11. The apparatus of claim 10, wherein said means for measuring both axial and torsional forces comprises a sensor secured between said actuator and said test stand.

12. The apparatus of claim 9, further comprising a means associated with said test stand for measuring the speed of said drive shaft member.

13. The apparatus of claim 9, further comprising a motor drive shaft connected to said actuator and operable to drive said actuator, means for measuring the rotational speed of said motor drive shaft, and means for measuring the torque acting on said motor drive shaft.

14. The apparatus of claim 9, wherein said means for applying braking force is operable to apply a torsional braking force without restricting axial movement of said drive shaft member.

15. The apparatus of claim 9, wherein said means for applying axial force comprises a double acting hydraulic or pneumatic ram.

* * * * *